United States Patent Office 2,746,901
Patented May 22, 1956

2,746,901

GLYCINAMIDE SALTS

William F. Bruce, Havertown, and Richard F. Tislow, Philadelphia, Pa., assignors to American Home Products Corporation, New York, N. Y., a corporation of Delaware No Drawing. Application June 14, 1954,
Serial No. 436,685

4 Claims. (Cl. 167—65)

This invention relates to compounds of the glycinamide type and more particularly to water-soluble, solid salts of alpha-di-alkylamino-N,N-di-alkyl acetamides and compositions containing the same.

It has been found that certain salts of tetra-substituted glycinamides falling within the general class of compounds having the formula

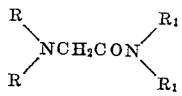

where R represents n-propyl, n-butyl, and isobutyl, and $R_1$ stands for ethyl, n-propyl and isopropyl, are useful for dysmenorrhea, essentially due to irregular contractions of the uterine muscle, and additionally are useful as oxytocics for veterinary or human use.

The compounds of the invention may be used either orally or parenterally, some of the compounds being highly effective by both routes while others are strikingly effective by a particular route of medication. Thus, selected salts of di-n-propylamino-N,N-di-n-propyl acetamide, di-n-butylamino-N,N-di-ethyl acetamide and di-iso-butylamino-N,N-di-ethyl acetamide are highly effective both orally and intravenously while others falling within the class are more effective by a single route.

In general, the bases may be synthesized by reacting an appropriate chloracetamide corresponding to the formula

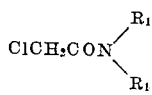

with an appropriate secondary amine $(R)_2NH$ where R and $R_1$ designate the radicals indicated above.

The preferred method for the preparation of the chloracetamide intermediate involves reacting chloracetyl chloride with a secondary amine $(R_1)_2NH$ in the presence of benzene, toluene, or ether as a solvent for the reactants. Cooling may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is operated with a molar ratio, amide to amine, of about 1:1, although preferably there is an excess of amine with a ratio of 1:2 or greater. The reaction is carried out in the presence of a solvent for the reactants such as higher alcohols having 4 to 7 carbon atoms in the molecule, dioxane or hydrocarbon solvents such as xylene. The amount of solvent used is so selected as to not only dissolve the reactants but to have a sufficient amount for refluxing. The reaction is carried out in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing temperature of the particular solvent selected. Generally, a reaction or refluxing time of about 12–24 hours is sufficient for complete reaction. In the event that solids are formed, these are removed by filtration, the substituted glycinamide product remaining in solution in the solvent. The latter is finally removed by distillation at low pressures to obtain the desired product.

For the therapeutic uses contemplated, namely, as oral or parenteral medicinals, the compounds must obviously be nontoxic at the dosages used. Additionally, they should be water-soluble and stable under normal conditions of storage and use.

Since the bases are high boiling liquids of limited water solubility, and moreover are undesirable in taste, they cannot be used successfully in oral compositions. The salts of the common inorganic and organic acids are, with a few exceptions, all water-soluble as, for example, the salts of hydrobromic, phosphoric, nitric or acetic, propionic, butyric, lactic, tartaric, benzoic, citric, malic, succinic acids, etc., but all of these are syrups which are not useful in solid compositions such as tablets or powders. Moreover, these syrups generally contain sufficient water to render the compounds too unstable for satisfactory use. In the presence of moisture, amides hydrolyze to acids and amines and the latter will then oxidize and turn dark, besides being somewhat corosive.

It may be well to point out that by water-soluble salts we mean salts that have a solubility in water of at least about 5% by weight per unit of liquid volume at 25° C.

It has been found that hydrochloric acid, perchloric acid and sulfuric acid will generally combine with the free bases to form solid salts that are water-soluble. However, the hydrochloride salt will often come down as an undesirable syrup and, in addition, is not satisfactory since it is extremely hygroscopic. On the other hand, both the perchlorate and the acid sulfate salts are stable and non-hygroscopic compounds and, in the solid form, are highly effective for pharmaceutical purposes, with the acid sulfates being particularly preferred.

The acid sulfate and perchlorate salts of the substituted glycinamides of the type described may be used as such or in the pulverized, dry form to be dissolved in an aqueous medium by the physician at the time of use, for either intravenous or intramuscular injection. A suitable composition for intramuscular use contains, besides about 1 to 4 mg. of active ingredient, a bacteriostatic agent such as merthiolate, in an amount of about 1:10,000 when reconstituted with water, and a carrier, such as dextrose or sodium chloride, preferably the latter since the proper amount will help to give an isotonic solution when reconstituted. In a 10 cc. multidose vial, one would use about .085 gram of sodium chloride or about 0.5 gram of dextrose. A surface-active agent such as long-chain fatty acid partial esters of hexitol anhydrides or oxyalkylene derivatives thereof, identified in the trade as "Spans" or "Tweens," or other lipoid solvents and wetting agents may be added to aid in easier solution and use of the active ingredients.

In order to utilize the salts of the invention in the form of tablets for oral use, they are compounded with a binder, such as glucose, gelatine, gum acacia, etc., preferably sugar syrup, and a diluent, such as starch, sucrose, lactose, kaolin, but preferably mannitol, and a small amount of lubricant as, for example, white mineral oil, talc or preferably a stearate such as calcium or magnesium stearate. They are compounded to contain about 2 to 8 mg. of active therapeutic agent although up to 100 mg. per kilogram has not been found toxic in animals. These are merely examples of useful compositions.

Proceeding to a better understanding of the invention, illustrative specific procedures for the preparation of representative compounds falling within the general formula are set forth in the following examples.

EXAMPLE 1

*Preparation of di-n-butylamino-N,N-di-n-propylacetamide*

To a solution of 202 g. of di-n-propylamine in 500 cc. of toluene was slowly added with stirring and cooling to −20° C. 112 g. of chloracetyl chloride. The reaction mixture was allowed to stand overnight and warm up to room temperature. The precipitate of di-n-propylamine hydrochloride was collected on a filter and thoroughly washed with toluene. The toluene solutions were then combined, washed well with water, dried over magnesium sulfate and distilled. The product boiled from 90–92° C. at 0.8 mm.

To 10 g. of N,N-di-n-propyl chloracetamide in 25 cc. of n-butyl alcohol was added 7.9 g. of di-n-butylamine and 5.1 g. of sodium bicarbonate. After refluxing overnight, the product was washed with water and distilled from 149–155° C. at 5 mm.

To 270 mg. of di-n-butylamino-N,N-di-n-propylacetamide was added slowly with stirring 105 mg. of 93% sulfuric acid. Heat was evolved and the reactants combined to form a clear viscous liquid. On standing several hours, this began to crystallize in rosettes. After standing overnight, the solid acid sulfate was washed with alcohol-free ether and dried in the air. It melted at 70–80° C. and after drying in a Fischer pistol melted at 75–78° C.

EXAMPLE 2

*Preparation of di-n-butylamino-N,N-di-n-butylacetamide*

To a solution of 387 g. of di-n-butylamine in 800 cc. of toluene at −20° C. was added slowly with stirring 168 g. of chloracetylchloride. After standing overnight and coming to room temperature, the di-n-butylamine hydrochloride was collected on a filter and thoroughly washed with toluene. The toluene solutions were combined, washed well with water, dried over magnesium sulfate and distilled. The product boiled from 122–126° C. at 3 mm.; $n_D^{20}$ 1.4670;

$$d_{26.5}^{29.5}\ 1.005$$

To a solution of 12 g. of N,N-di-n-butyl chloracetamide in 30 cc. of butanol was added 7.9 g. of di-n-butyl amine and 6 g. of sodium bicarbonate. The mixture was refluxed overnight. The product was washed with water and distilled to give the desired product boiling at 130–140° C. at 3 mm.

To 298 mg. of di-n-butylamino-N,N-di-n-butylacetamide was added slowly with stirring 105 mg. of 93% sulfuric acid. Heat was evolved and the reactants combined to form a clear colorless viscous liquid. After standing overnight, the solid sulfate was washed thoroughly with alcohol-free ether and dried in the air. The yield was 345 mg. of white solid melting from 90–95° C. After drying in a Fischer pistol, it was melted at 104–106° C.

EXAMPLE 3

*Preparation of di-n-butyl amino-N,N-diethylacetamide*

In a five liter three-necked flask equipped with stirrer, dropping funnel, and thermometer, was placed 1800 ml. of butanol (solvent) and 450 g. of potassium carbonate. To this was added 225 grams of chloro-N,N-diethylacetamide and 510 g. of di-n-butylamine, and the mixture was refluxed for twenty hours. The solution was cooled, filtered to remove solid material, and then washed with 1% hydrochloric acid, and with water. The solvent was removed by distillation at 20 mm. The remaining oil was vacuum distilled over 25 g. of potassium carbonate. The fraction distilling from 115–130° C. at 4 mm. mercury pressure was collected. Upon redistillation, the fraction collected distilled at 117–122° C. at 3 mm. mercury pressure and had a negative Beilstein test.

To 2.4 g. of di-n-butylamino-N,N-diethylacetamide was added dropwise with stirring 1.0 cc. of 70% perchloric acid. After thorough stirring, the pH of the resulting mixture of syrup and crystals was adjusted to 6 and after standing overnight, the product solidified and was washed thoroughly with dry ether; M. P. 107–109° C.

*Analysis.*—Calcd. for $C_{14}H_{30}N_2O \cdot HClO_4$: N, 8.21. Found: N, 8.02.

To 2.4 g. of di-n-butylamino-N,N-diethylacetamide was added dropwise with stirring 0.6 cc. of 95% sulfuric acid in 1 cc. of distilled water. After a thorough stirring, the product stood overnight and was then washed thoroughly with dry ether; M. P. 104–106° C. after crystallization from isopropanol.

*Analysis.*—Calcd. for $C_{14}H_{30}N_2O \cdot H_2SO_4$: N, 8.23. Found: N, 8.02.

EXAMPLE 4

*Preparation of di-n-propylamino-N,N-di-isopropylacetamide*

In a five liter, three-necked flask, equipped with stirrer, dropping funnel, and low temperature thermometer was put 1500 ml. of toluene and 607.2 g. of di-isopropylamine. The flask was cooled to −30° C. and kept at this temperature during the dropwise addition of a mixture of 339 g. of chloroacetyl chloride in 500 ml. of toluene. The mixture was then allowed to return to room temperature, and the toluene was distilled in vacuo. The remaining material was vacuum distilled, and the fraction boiling at 90–100° C. at 3 mm. mercury pressure was collected. This material was quite dark, and was redistilled, again collecting the distillate from 90–100° C. at 3 mm. mercury pressure. The product has a slight reddish color, and crystallized upon standing. Upon purification from hot petroleum ether, the product was obtained in the form of white needles; m. 48–50° C.

*Analysis.*—Calcd. for $C_8H_{16}ClNO$: C, 54.3; H, 9.05; Cl, 20.0; N, 7.93. Found: C, 54.46; H, 9.00; Cl, 19.5; N, 7.16.

In a one liter three-necked flask equipped with thermometer, dropping funnel, and reflux condenser, was placed 500 ml. of n-butyl alcohol and 120 g. of potassium carbonate. To this was added 50.6 g. of di-n-propylamine and 43.9 g. of chloro-N,N-di-isopropylacetamide. The mixture was refluxed for 24 hours. The solution was filtered, washed with potassium carbonate solution, and with water. The n-butyl alcohol was removed by distillation in vacuo and the product was distilled; the fraction boiling from 108–112° C. at 3 mm. was collected; $n_D^{25}$ 1.4480;

$$d_{25}^{25}\ 0.8833$$

To the di-n-propylamino-N,N-di-isopropylacetamide was slowly added 70% perchloric acid. Upon stirring, a thick precipitate appeared. This precipitate was dissolved in methanol, filtered, and recrystallized by the addition of ether to the cold methanol solution. The crystals were collected on a filter, washed with petroleum ether, and dried in a Fischer pistol at 100° C. for half an hour; melting point 148–150° C.

*Analysis.*—Calcd. for $C_{14}H_{52}N_2O \cdot HClO_4$: C, 49.2; H, 9.1; N, 8.2; Cl, 10.2. Found: C, 48.51; H, 8.79; N, 8.14; Cl, 10.1.

EXAMPLE 5

*Preparation of di-isobutylamino-N,N-diethylacetamide*

In a 500 ml. flask equipped with stirrer, thermometer, and reflux condenser, was placed 300 ml. of n-butyl alcohol and 55 g. of potassium carbonate. To this was added 35 g. of di-isobutylamine and 34.8 g. of chloro-N,N-diethylacetamide, and the mixture was refluxed for fourteen hours. The solution was cooled, filtered, and washed with water. The butyl alcohol solvent was removed by distillation in vacuo and the remaining oil was distilled over potassium carbonate. The fraction boiling at 111–118° C. at 4 mm. was collected. The product was redistilled, collecting the fraction from 93–96° C. at 3 mm.; $n_D^{25}$ 1.4520;

$$d_{25}^{25}\ 0.8794$$

*Analysis.*—Calcd. for $C_{14}H_{30}N_2O$: C, 69.4; H, 12.4; N, 11.6. Found: C, 69.2; H, 12.2; N, 11.4.

To 2.4 g. of di-isobutylamino-N,N-diethylacetamide was added dropwise with stirring 1.0 cc. of 70% perchloric acid. After thorough stirring, the pH of the resulting mixture of syrup and crystals was adjusted to pH 6 and after standing overnight, the product was washed well with dry ether; M. P. 84–86° C. after drying at 60° C. in a Fischer pistol for 1 hour to obtain a solid product.

*Analysis.*—Calcd. for $C_{14}H_{30}N_2O \cdot HClO_4$: N, 8.17. Found: N, 8.08.

To 2.4 g. of di-isobutylamino-N,N-diethylacetamide was added dropwise with stirring 0.6 cc. of 95% sulfuric acid in 1 cc. of distilled water. After a thorough stirring, the product stood overnight and was then washed thoroughly with dry ether; M. P. 84–86° C. after drying in a Fischer pistol for one hour at 65° C. to obtain a solid product.

*Analysis.*—Calcd. for $C_{14}H_{30}N_2O \cdot H_2SO_4$: N, 8.23; $SO_4$, 28.2. Found: N, 8.01; $SO_4$, 28.6.

EXAMPLE 6

*Preparation of di - n - butylamino - N,N - di - isopropylacetamide*

In a one liter, three-necked flask equipped with stirrer, thermometer, and reflux condenser were placed 500 ml. of n-butyl alcohol, 120 g. of potassium carbonate, 51.6 g. of di-n-butylamine and 35.4 g. of chloro-N,N-di-isopropylacetamide. The mixture was refluxed for twenty-four hours, then filtered, washed, and dried over anhydrous magnesium sulfate; and the butyl alcohol distilled off. The remaining material was vacuum distilled, and the fraction distilling from 120° C. to 140° C. at 2–4 mm. was collected. This fraction was redistilled from over potassium carbonate, and the fraction distilling from 130–136° C. at 3 mm. was collected; $n_D^{24}$ 1.4518.

The perchlorate salt was made by adding sufficient perchloric acid (70%) to neutralize a sample of the product. A solid crystallized, which was dissolved in alcohol, filtered, and recrystallized by addition of ether; m. 102–104° C.

EXAMPLE 7

*Preparation of di - n - propylamino - N,N - di - n - propylacetamide*

108 g. (0.6 mol) of chlor-N,N-di-n-propylacetamide was placed in a 1000 ml. round bottomed three-necked flask, added 136 g. of di-n-propylamine, 20 g. of anhydrous $K_2CO_3$ and 500 ml. of toluene added and allowed to reflux for 20 hours, stirring, and heating with a glascol. The mixture was filtered hot, washed with toluene, the filtrates were combined, washed with 1000 ml. of distilled water in two equal portions and dried over 40 g. of anhydrous magnesium sulfate. The toluene was then distilled in vacuo and the residue fractionated at 0.6–0.8 mm., 104.5 g. constituting the fraction obtained at 112–113° C.

To 2.4 g. of di-n-propylamino-N,N-di-n-propylacetamide was added dropwise with stirring 0.6 cc. of concentrated sulfuric acid in 1 cc. of water. The resulting solid was washed with dry ether and melted at 86–88° C.

*Analysis.*—Calcd. for $C_{14}H_{30}N_2O \cdot H_2SO_4$: C, 49.35; H, 9.39; N, 8.23; S, 9.38. Found: C, 49.21; 49.13; H, 9.55; N, 8.44; S, 9.35.

To 2.4 g. of di-n-propylamino-N,N-di-n-propylacetamide was added dropwise with stirring 1.0 cc. of 70% perchloric acid. The solution was adjusted to pH 6 by adding a few drops of base, and the white solid which resulted was washed with dry ether; M. P. 114–116° C. after drying to a solid in a Fischer pistol.

*Analysis.*—Calcd. for $C_{14}H_{30}N_2O \cdot HClO_4$: C, 49.1; H, 9.13; N, 8.21. Found: C, 48.90, 48.98; H, 9.15; N, 8.14.

EXAMPLE 8

*Preparation of di - isobutylamino - N,N - di - n - propylacetamide*

To 19.0 g. of chlor-N,N-di-n-propylacetamide, 200 ml. of n-butanol and 10 g. of anhydrous $K_2CO_3$ into a 500 ml. round bottomed two-necked flask, was added 29.0 g. of di-isobutylamine, and the mixture was refluxed for 19 hours. The solid was then filtered hot by suction, the liquid washed with water, and dried over 20 g. of anhydrous magnesium sulfate filtered and concentrated after in vacuum. The residue in 100 ml. of ether, in order to remove traces of chlorine, was washed with 2 N NaOH and water, dried over $MgSO_4$, filtered, concentrated in vacuum, and fractionated at 0.2–0.25 mm. Hg. (oil bath 150° C.) to give an oil boiling at 98–99° C. $n_D^{25}$ 1.4530, $$d_{25}^{25}\ 0.892$$

*Analysis.*—Calcd. for $C_{16}H_{34}N_2O$: C, 71.3; H, 12.6. Found: C, 71.77; H, 12.25.

To 2.7 g. of di-isobutylamino-N,N-di-n-propylacetamide was added 0.6 cc. of sulfuric acid in 1 cc. of water. The solid sulfate product was washed with ether; M. P. 90–91° C.

To 2.7 g. of di-isobutylamino-N,N-di-n-propylacetamide was added 1 cc. of 70% perchloric acid. The white solid perchlorate which resulted was washed with ether, m. 110–112° C.

EXAMPLE 9

A composition was made up containing 7.2 mg. of di-n-butylamino-N,N-diethylacetamide acid sulfate, 3 mg. magnesium stearate with sufficient granulated lactose to make into a 100 mg. tablet. The lactose was prepared by mixing powdered lactose with glucose syrup, drying and screening through a 20 mesh screen.

EXAMPLE 10

An oral capsule was prepared using the same active ingredient as in Example 9 but omitting the stearate and using about 93 mg. of powdered lactose.

EXAMPLE 11

An intravenous preparation was made combining in a multi-dose vial 28.2 mg. of di-n-butylamino-N,N-diethylacetamide acid sulfate salt, 90 mg. sodium chloride and 0.1 mg. of Thiomersol (sodium ethyl mercuric thiosalicylate). This dry composition is to be reconstituted with 10 cc. of sterile water.

We claim:

1. As a new compound, a solid, water-soluble, inorganic salt of the group consisting of the acid sulfate and the perchlorate salt of a glycinamide of the formula $(R)_2NCH_2CON(R_1)_2$ wherein R represents a lower alkyl of 3 to 4 carbon atoms and $R_1$ stands for a lower alkyl of 2 to 3 carbon atoms.

2. A therapeutic composition comprising as the active agent the acid sulfate salt of a glycinamide having the formula $(R)_2NCH_2CON(R_1)_2$ wherein R represents a lower alkyl of 3 to 4 carbon atoms and $R_1$ stands for a lower alkyl of 2 to 3 carbon atoms, and a carrier for said active agent.

3. As a new compound, the acid sulfate salt of alpha-di-n-butylamino-N,N-diethylacetamide.

4. As a new compound, alpha-di-n-butylamino-N,N-diethylacetamide perchlorate.

(References on following page)

References Cited in the file of this patent

UNITED STATES PATENTS

| | | |
|---|---|---|
| 2,256,186 | Balle et al. | Sept. 16, 1941 |
| 2,451,436 | Erickson | Oct. 12, 1948 |
| 2,480,439 | Bersworth | Aug. 30, 1949 |
| 2,516,674 | Bruce | July 25, 1950 |
| 2,580,411 | Cusic | Jan. 1, 1952 |

OTHER REFERENCES

Ti: "Comptes Rendus," vol. 191 (1930), pp. 943–45.